US008395845B2

(12) United States Patent
Rana

(10) Patent No.: US 8,395,845 B2
(45) Date of Patent: Mar. 12, 2013

(54) LENS ARRANGEMENT

(75) Inventor: Harbinder Rana, Salisbury (GB)

(73) Assignee: The Secretary of State for Defence in Her Britannic Majesty's Government of the United Kingdom of Great Britain and Northern Ireland (GB)

( * ) Notice: Subject to any disclaimer, the term of this patent is extended or adjusted under 35 U.S.C. 154(b) by 920 days.

(21) Appl. No.: 12/441,902

(22) PCT Filed: Sep. 24, 2007

(86) PCT No.: PCT/GB2007/003617

§ 371 (c)(1), (2), (4) Date: Apr. 13, 2009

(87) PCT Pub. No.: WO2008/035107

PCT Pub. Date: Mar. 27, 2008

(65) Prior Publication Data

US 2010/0020406 A1 Jan. 28, 2010

(30) Foreign Application Priority Data

Sep. 22, 2006 (GB) .................................. 0618671.2

(51) Int. Cl.
*G02B 25/00* (2006.01)

(52) U.S. Cl. ...................................................... 359/643

(58) Field of Classification Search ........... 359/643–647
See application file for complete search history.

(56) References Cited

U.S. PATENT DOCUMENTS

| | | | | |
|---|---|---|---|---|
| 2,206,195 A * | 7/1940 | Konig | ........................... | 359/645 |
| 2,900,871 A * | 8/1959 | Baker | ........................... | 359/645 |
| 3,456,999 A | 7/1969 | Hopp | | |
| 3,938,875 A * | 2/1976 | Ruder | ............................ | 42/113 |
| 4,525,039 A | 6/1985 | Defuans | | |
| 5,255,121 A | 10/1993 | Suzuki | | |
| 5,638,213 A * | 6/1997 | Ueno | ........................... | 359/643 |
| 6,607,283 B1 | 8/2003 | Cozad | | |

FOREIGN PATENT DOCUMENTS

| | | |
|---|---|---|
| CN | 1690352 A | 11/2005 |
| DE | 3925246 | 4/1990 |
| EP | 1357414 | 10/2003 |
| GB | 2107077 | 4/1983 |

OTHER PUBLICATIONS

C.J.R. Lord, 'Evolution of the Astronomical Eyepiece,' pp. 2-55 and (i)-(iv), 1996.
Search Report dated Jan. 11, 2007 in Application No. GB0618671.2.
Search/Examination Report dated Jan. 28, 2011 in Application No. GB0904563.4.
Search Report dated Feb. 26, 2008 in Application No. PCT/GB2007/003617.
Forer, et al., "Gradient-index eyepiece design," *Applied Optics*, 22(3):407-412 (1983).

* cited by examiner

*Primary Examiner* — Scott J Sugarman
(74) *Attorney, Agent, or Firm* — Dean W. Russell; Kilpatrick Townsend & Stockton LLP

(57) ABSTRACT

A lens arrangement suitable for looking through small holes is provided in which no conventional integral physical lens stop is required. The lens arrangement is relatively insensitive to its position, meaning that it may be set back behind the hole reducing the risk of detection and allowing rapid installation.

16 Claims, 6 Drawing Sheets

1
4
3
2

6
5
1
S
2
3
4

6
5
1
S
2
3
4

1
2
3
4
5
6
S 6
5
9
7
1
8
S
2
3
4

6
5
1
S
2
3
4

LENS ARRANGEMENT

CROSS REFERENCE TO RELATED APPLICATIONS

This application is the U.S. national phase of International Application No. PCT/GB2007/003617 filed on Sep. 24, 2007 and published in English on Mar. 27, 2008 as International Publication No. WO 2008/035107 A1, which application claims priority to Great Britain Patent Application No. 0618671.2 filed on Sep. 22, 2006, the contents of which are incorporated herein by reference.

The present invention relates to optical lenses and in particular to lenses for camera systems. The invention is of use most especially in the field of covert surveillance cameras in which very small "pinhole" camera lenses are used.

Pinhole lenses are useful because of their small size; a typical lens may have a diameter of only a few millimetres, allowing the lens to be effectively hidden from view. Pinhole cameras are typically concealed behind a wall or other barrier and a small hole, referred to as a pinhole, is made in the barrier to enable a scene to be viewed and monitored in secret. In this specification a pinhole is defined as a hole having a diameter of 2 mm or less. A disadvantage of these known lenses is that a physical stop is required to limit the pencil of rays that are permitted to pass through them onto an image capturing means such as a film or sensor or the human eye. For a pinhole lens as described above the physical stop often has to protrude into the hole in the wall to provide acceptable image quality and reduce vignetting, significantly increasing the risk of detection (see FIG. 1). The distance between the lens and the physical stop must also be precisely controlled in order to obtain useful images.

The present invention overcomes these difficulties with the prior art by providing a lens arrangement which does not require a conventional physical stop to limit the pencil of rays passing through the lenses. This is achieved by producing a lens arrangement that is specially adapted to look through pinholes such that the pinhole itself acts to limit the pencil of rays that can pass into the lenses thereby removing the need for a conventional physical stop. In doing so the invention overcomes a strong technical prejudice in the art which dictates that a conventional physical stop must be used in order to obtain satisfactory results.

Furthermore in known lens arrangements the position of the physical stop is critical to the image quality achieved. Any movement of the physical stop leads to severe optical aberrations and image degradation. For this reason known systems use a physical stop that is integral to the lens arrangement so that its optical position remains fixed. The present invention provides a lens arrangement that is relatively insensitive to the position of the physical stop enabling the pinhole itself to perform the function of the physical stop with no recognisable loss of image quality. The invention therefore represents a considerable departure from known practices and involves a reduction in the complexity and costs associated with the lens system.

The absence of a conventional physical stop means that the camera and lens arrangement can be effectively hidden without protruding into the hole in the barrier. The entire camera assembly can in fact be set back from the hole in the barrier, significantly lowering the risk of the installation being discovered by conventional means, for example by using a torch to search for a glint from the lens.

The present invention therefore provides a lens arrangement, suitable for looking through pinholes, comprising a converging eyepiece type lens apparatus used without a conventional objective lens and arranged such that the lens arrangement projects a "virtual" aperture to a point in object space beyond a first end of the lens arrangement, said first end being the end of the lens arrangement closest to the subject being viewed, such that the virtual aperture limits the pencil of rays passing into the lens arrangement, wherein the lens arrangement contains no integral physical lens stop.

In a conventional eyepiece an exit pupil is located behind the eyepiece lenses to define the amount of light that may exit the system. In the present invention however the eyepiece lenses are reversed such that the original exit pupil is located in front of the lenses, acting as an entrance pupil and limiting the amount of light that can enter the system.

Advantageously, the lens arrangement provided by the present invention may therefore be used in a surveillance camera.

When viewing a subject through a hole using a conventional lens, the main problem is that if the hole is significantly smaller than the lens, the image produced by the lens is severely vignetted. Furthermore, if it is necessary to set the lens arrangement back from the hole to enable covert surveillance or because it is not possible to butt the lens close to the hole, or if the hole itself is relatively deep, this vignetting increases substantially. The distance that the lens arrangement is set back from the wall is referred to in this specification as the "stand off distance" and is defined as the distance between the lens arrangement and the end of the hole that is closest to the subject being viewed.

The present invention solves these problems with the prior art by using a novel lens arrangement which is similar to a converging telescope eyepiece except that the eyepiece arrangement is reversed so that the hole through which the subject is viewed is placed where the eye would normally be.

Telescopes are known that may be focussed on an object located in front of the telescope lens arrangement in "object space" in order to produce an image to be viewed behind the lens arrangement in "image space". The eyepiece lens apparatuses used in such telescopes do not require a physical lens stop as they are always used in conjunction with an objective lens to capture as much light as possible. The objective lens incorporates a physical lens stop which limits the pencil of rays that can enter the telescope and therefore regulates the light entering the eyepiece. The eyepiece is a fixed focus lens which projects a real image of the subject, within the boundaries set by the physical lens stop, to form an exit pupil in the image space a certain distance behind the telescope. This distance is known as eye relief. The eye is then placed at the exit pupil in order to view the subject. Only light rays which pass through this exit pupil are able to exit the system.

By reversing this eyepiece lens apparatus, the exit pupil becomes a kind of "virtual" aperture which is projected forward of the eyepiece lens apparatus into object space by the "eye relief" distance. This virtual aperture therefore defines the amount of light that can enter the eyepiece lens apparatus. The present invention utilises a lens arrangement of this type for looking through a pinhole in a barrier by ensuring that the "eye relief" distance equates roughly to the distance between the lens arrangement and the end of the pinhole that is closest to the subject being viewed (the stand off distance). In this way it is the virtual aperture projected forward into object space that limits the pencil of rays entering the system and not the pinhole itself, thus overcoming the vignetting normally experienced when using lenses to look through pinholes.

There are four basic types of eyepiece lens apparatus that may be used to provide the virtual aperture required by the invention. These are; the Ramsden eyepiece, which comprises two positive single lens elements; the Kellner eyepiece, which comprises one cemented doublet lens and one singlet lens, with the crown of the doublet facing the singlet; the Delabourne eyepiece, which is a symmetrical lens comprising two cemented doublet lenses with the crown elements facing each other; and the Erfle eyepiece, which comprises a strong biconvex singlet lens straddled by two cemented doublets with facing crown elements. It will be recognised however that any lens apparatus that enables production of a virtual aperture as described above may be used to produce a lens arrangement according to the invention.

In practice the actual optical elements selected will be dependent on the field of view required. For example, for narrow fields of view a modification of a Ramsden eyepiece may advantageously be used in order to minimise the size of the lens arrangement, however when wider fields of view are required a Kellner or Erfle eyepiece would be more appropriate.

It will be further recognised that the eyepiece lens apparatuses used in the prior art have not been designed to stand alone and therefore are designed with aberrations to compensate for the aberrations introduced by objective lens of the telescope. Since the present invention does not use a traditional objective lens such compensation is not necessary so an eyepiece lens apparatus would need to be modified before use in the invention.

By way of illustration and without limitation to the generality of the invention, a number of possible approaches to the production of a lens arrangement according to the invention will now be described. In the following descriptions the "first end" of the lens arrangement is defined as that end closest to the object being viewed and the "second end" of the lens arrangement is the opposite end, closest to the image capturing means.

As mentioned previously, the selection of the optical elements for a lens arrangement according to the invention is dependent upon the desired field of view.

A field of view of approximately 12 degrees may be produced by using only two optical elements, one positively shaped lens at the first end of the lens arrangement, and one negatively shaped lens at the second end, in a configuration that could be described as a reversed telephoto eyepiece. In a preferred configuration of this embodiment, the first positively shaped lens will be biconvex and the second negatively shaped lens will be biconcave.

Such a lens arrangement may usefully be designed to operate at an optimum stand off distance of 2.5 mm, behind a pinhole of approximately 1 mm diameter; and in a preferred embodiment the lens arrangement would be less than 5 mm long, have an effective focal length of approximately 30 mm and would therefore operate at around F/30.

A lens arrangement according to this embodiment of the invention is shown in FIG. 2.

A wider field of view of up to approximately 25 degrees may also be achieved by using a lens arrangement comprising only two optical elements. In this embodiment the lens arrangement may advantageously comprise one positively shaped lens, such as a biconvex lens, at the first end of the lens arrangement, followed by one thick meniscus lens at the second end. The meniscus lens acts as a field flattener, providing a flatter image plane at the image capturing means and therefore improving image quality. The meniscus lens also helps to correct any astigmatism.

Such a lens arrangement may usefully be designed to operate at an optimum stand off distance of approximately 4 mm, behind a pinhole of approximately 1 mm diameter; and in a preferred embodiment the lens arrangement would be less than 4 mm long, have an effective focal length of approximately 14 mm, and would therefore operate at around F/14.

A lens arrangement according to this embodiment of the invention is shown in FIG. 3.

The two lens arrangements described above may be considered to have evolved from a reversed Ramsden eyepiece; however it will be appreciated that some modification is necessary to achieve the desired performance since the Ramsden eyepiece simply comprises two positively shaped lenses.

A wider field of view of up to approximately 40 degrees may be achieved by using a slightly more complex lens arrangement, comprising of three optical elements, two positively shaped single lens elements with one negatively shaped single lens element located between them. A preferred embodiment of this configuration would comprise a single biconvex lens at the first end of the lens arrangement, followed by a single biconcave lens, and then a single positively shaped meniscus lens at the second end of the lens arrangement. This may be considered as an evolution of a reversed Kellner eyepiece, but again it deviates from the classic form of the Kellner as the usual doublet has been split into two singlets. This allows correction of field curvature problems using the steeper concave surface of the central negative lens to balance the field, and use of the combination of this element and the last positive lens also acts to correct astigmatism.

Such a lens arrangement may usefully be designed to operate at an optimum stand off distance of approximately 2.5 mm, behind a pinhole of approximately 1 mm diameter; and in a preferred embodiment the lens arrangement would be approximately 5 mm long, have an effective focal length of approximately 8.5 mm, and would therefore operate at around F/8.5.

A lens arrangement according to this embodiment of the invention is shown in FIG. 4.

To achieve a field of view of up to approximately 50 degrees, a lens arrangement comprising a cemented doublet straddled by two singlet elements may be used. This lens arrangement may also be considered to be an evolution of a reversed Kellner eyepiece but in this case deviates from the classic form with the addition of a field flattener at the rear which takes the form of a single meniscus lens element. This is advantageous as it acts to correct the field curvature and balance the astigmatism. A preferred embodiment of this type of lens arrangement would comprise a relatively thick negatively shaped meniscus lens at the first end of the lens arrangement for greater control of the stand off distance, followed by an achromatic doublet with the crown element facing the first end of the lens arrangement for correction of residual lateral chromatic aberration, and a positively shaped single meniscus lens at the second end of the lens arrangement to act as a field flattener and provide a flatter image at the image plane.

Such a lens arrangement may usefully be designed to operate at an optimum stand off distance of approximately 3 mm, behind a pinhole of approximately 1 mm diameter; and in a preferred embodiment the lens arrangement would be approximately 9.5 mm long, have an effective focal length of approximately 6.5 mm, and would therefore operate at around F/6.5.

A lens arrangement according to this embodiment of the invention is shown in FIG. 5.

A field of view of up to approximately 65 degrees may also be achieved by using a lens arrangement comprising a cemented doublet lens at the first end of the lens arrangement followed by a positively shaped single lens element, such as a strong biconvex lens, and a cemented triplet lens at the second end of the lens arrangement. This arrangement could be said to have evolved from a reversed Erfle type eyepiece but deviates from the classic form with the addition of another element to the last cemented doublet to produce a cemented triplet. This allows correction of lateral colour problems and of the variation of astigmatism with wavelength. In a preferred embodiment of this configuration, the cemented doublet at the first end of the lens arrangement advantageously forms a thick, negatively shaped meniscus lens, which helps to maintain the tolerance of the lens arrangement to changes in the stand off distance.

Such a lens arrangement may usefully be designed to operate at an optimum stand off distance of approximately 2 mm, behind a pinhole of approximately 1 mm diameter; and in a preferred embodiment the lens arrangement would be approximately 10 mm long, have an effective focal length of approximately 5 mm, and would therefore operate at around F/5.

A lens arrangement according to this embodiment of the invention is shown in FIG. 6.

It will be appreciated that many other configurations of lens arrangements according to the invention are possible and that many different fields of view may be achieved. The only element of the known eyepieces that must be retained in order to work the invention is the production of the virtual stop in front of the lens arrangement.

In fact, due to the production of a virtual stop in front of the lens arrangement, the present invention is even able to produce usable images without using the pinhole as a physical lens stop. This means that images can be obtained with no physical lens stop whatsoever.

If the physical stop were removed from a conventional lens arrangement, light would enter the lens from all directions resulting in too much light being transmitted to the image capturing means, for example the sensor or film. The image capturing means would then be unable to cope with the dynamic range of the light leading to poor image resolution. However, the present invention overcomes this as the pencil of rays is limited by passing through the virtual aperture enabling a satisfactory image to be formed.

The image quality produced by a lens arrangement according to the present invention when not viewing through a hole is acceptable for many purposes such as security cameras, and although the absence of a physical stop does cause some loss of quality due to the increased light levels admitted, it will be appreciated that advances in technology, particularly in the field of digital sensors, will continue to reduce the significance of this problem.

Due to the novel arrangement of the lenses enabling the conventional integral physical lens stop to be dispensed with, the present invention provides a very compact, high quality, imaging lens that is ideally suited for looking though small holes. Furthermore the absence of a physical lens stop reduces the complexity of the lens arrangement and the number of components that are required thus reducing the costs associated with the system.

However, even with the use of a virtual aperture to combat vignetting as described above, a conventional lens arrangement can only obtain good quality images when looking through a pinhole if that pinhole is itself perfectly circular with smooth edges and then only if the barrier through which the hole is made is thin. If these attributes are not adequately controlled, the resultant images will be severely degraded.

Furthermore, although the use of a pinhole in a physical barrier offers a physical stop with the potential to improve image quality, because the barrier is not connected to the lens in any way its use with a conventional lens arrangement would be highly dependent on accurate placement of the lens. Therefore in known systems the stand off distance of the lens arrangement must be carefully controlled to minimise the optical aberrations caused by the lens or lenses. In these systems image quality is dramatically reduced even by relatively small changes in the stand off distance, therefore if the lenses are installed incorrectly, large levels of aberrations result, rendering the resultant images unusable.

This is obviously a major disadvantage in surveillance applications where it is often necessary to set the optical device up quickly behind a simple drilled hole which may have poor edge quality.

The current invention overcomes these problems with the prior art by the use of a virtual aperture and by overdesigning the lenses so as to reduce optical aberrations, thereby increasing the tolerance of the lens system to variations in the stand off distance and pinhole imperfections. This overdesign comprises using lenses having larger diameters in order that the lens arrangement projects a virtual aperture larger than the aperture in the barrier.

The effect of an increase in lens diameter is to cause the rays of light to pass through an annular zone of the lens which is relatively closer to the optical axis, reducing the curvature of the lens through which they pass thus reducing the number and size of the resulting optical aberrations. The invention acts to reduce all aberrations but is particularly effective in reducing spherical aberrations and coma. The overdesign gives a larger operational area of lens meaning that the lens may be moved backwards away from the pinhole without causing a significant increase in the aberrations produced. This reduces the sensitivity of a camera system to improper installation or movement of the lens relative to the pinhole thus increasing the chances of obtaining useful images. This is because the increase in the diameter of the lenses leads to an increase in the optimum stand off distance of the lens arrangement, thereby reducing the percentage errors caused by a given error in installation of the device.

When the lens is at its nearest to the pinhole, the increased area of lens is not used and has no effect on the image obtained. The decrease in curvature does however result in less refraction of the incident light therefore a series of lenses in combination may be needed to achieve the desired focus. Alternatively a material of higher refractive index may be used.

The overdesign of the lenses may also be characterised as producing a lens arrangement such that the virtual aperture that is projected forwards by the lens arrangement is larger than the size of the pinhole that the lens arrangement is looking through. This means that should errors in the installation of the lens arrangement cause the pinhole to be larger than intended or mean that the lens arrangement is not located at the ideal stand off distance, the lenses will still be able to capture all the light passing through the pinhole.

By employing the overdesign of the lenses according to the invention useful images may be easily achieved within a range of stand off distances between 0.5 mm and 10 mm. The amount of tolerance to variations in the stand off distance increases as the size of virtual aperture increases and this size is limited only by spatial constraints and cost.

Advantageously the diameter of the virtual aperture may be overdesigned to be in the range of 1 to 5 times the diameter of the pinhole. In a preferred embodiment the virtual aperture would be at least one and a half times as large in diameter as the hole through which it is intended for the lens arrangement to look.

The present invention therefore provides a lens arrangement that will operate effectively over a wide range of barrier thicknesses and that may be easily scaled up or down to suit a different diameter of pinhole. It is preferred that the pinhole will be less than 2 mm in diameter, but the invention may be applied to larger holes. An example of a use for this embodiment of the invention would be a surveillance camera surreptitiously placed behind a pinhole in a wall.

A specific embodiment of the invention in which the lens arrangement is used in a pinhole camera placed behind a pinhole in a barrier, will now be described with reference to the following drawings.

It will be understood that the following is simply an example of a particular embodiment of the invention and should not be taken as limiting its scope in any way.

Figure 1:
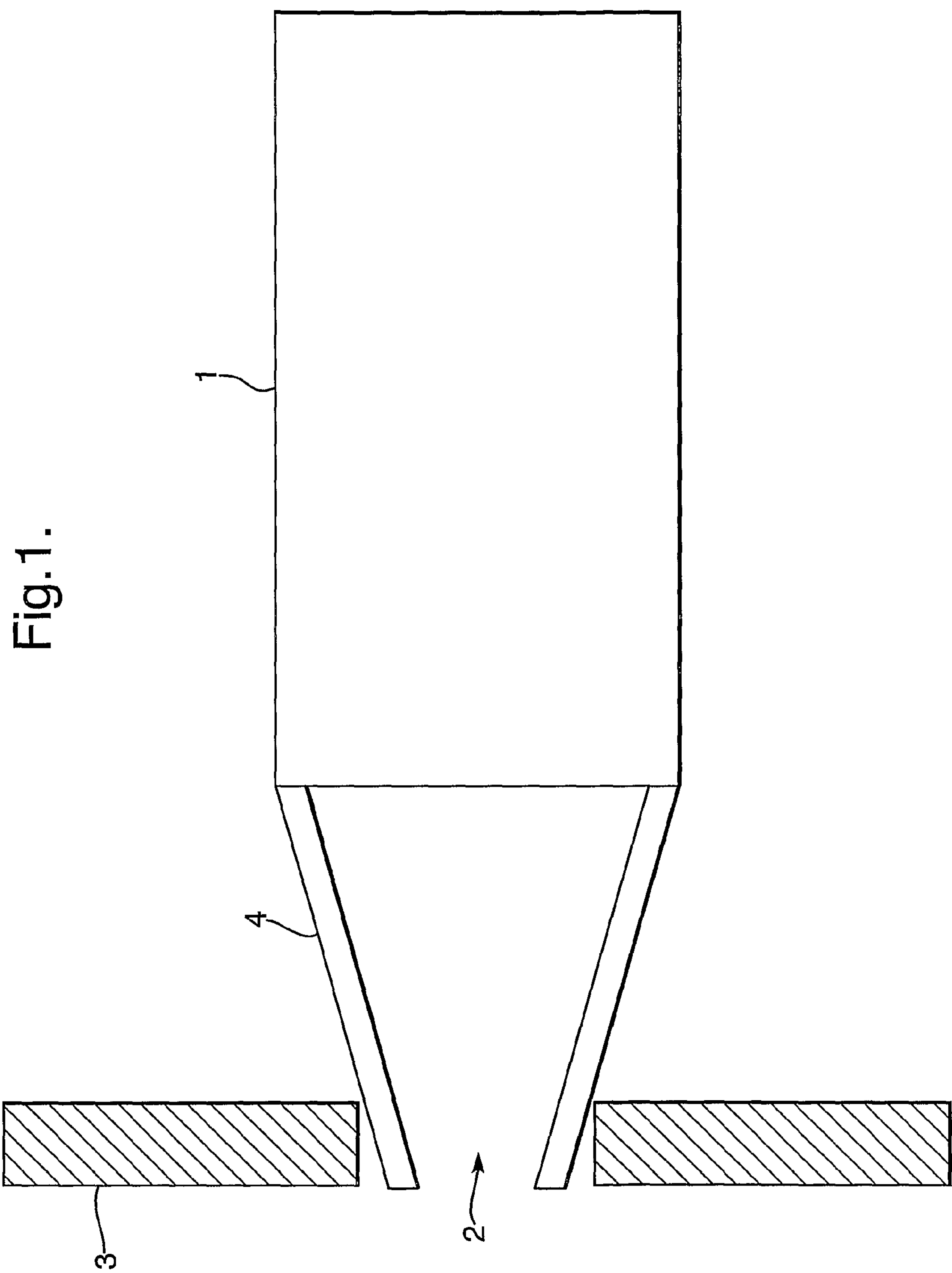
FIG. 1 shows a known surveillance camera (1) hidden behind a pinhole (2) in a barrier (3) such that the physical stop (4) protrudes into the pinhole.
Figure 2:
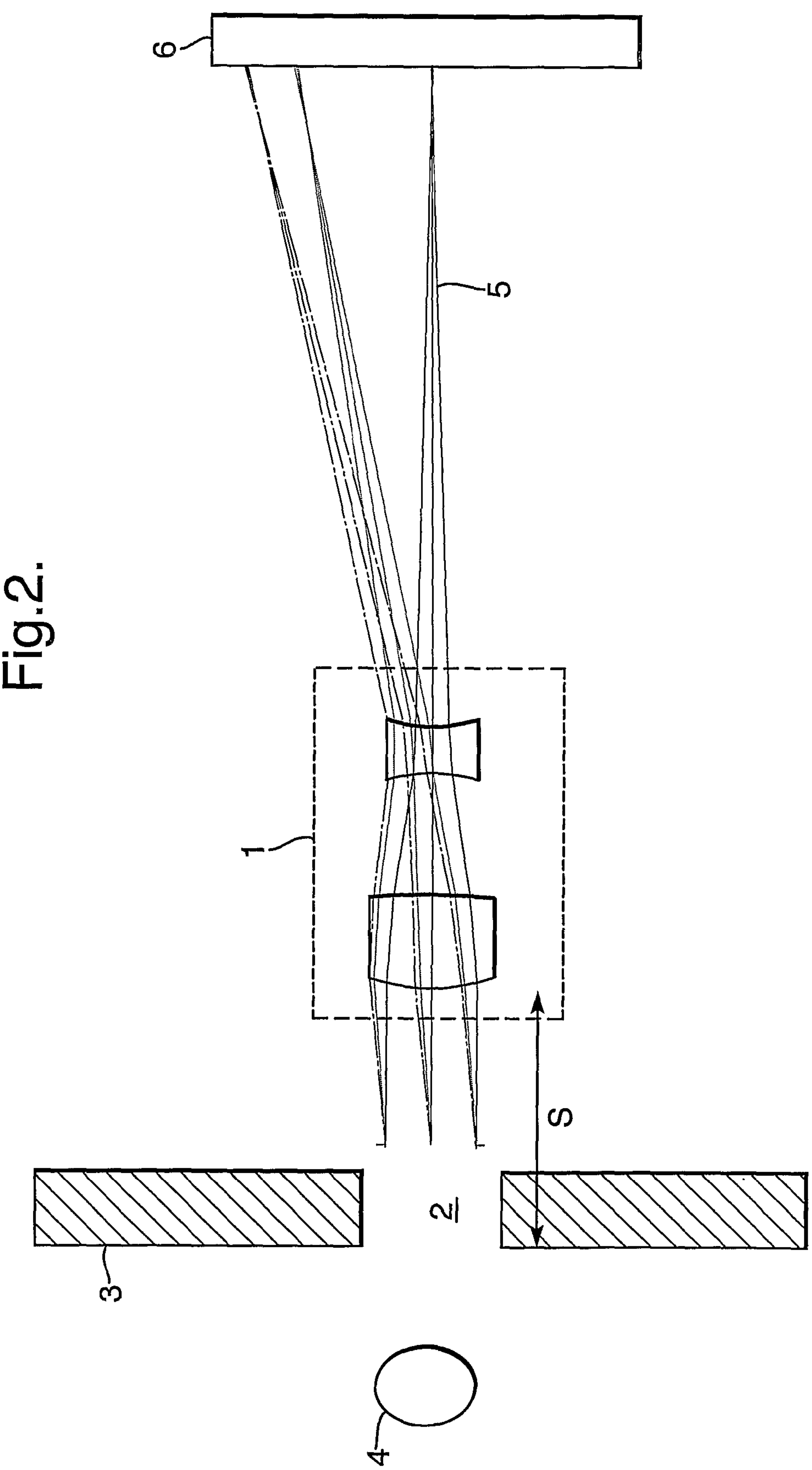
FIG. 2 shows an embodiment of the lens arrangement according to the present invention optimised for a field of view of 12 degrees and located behind a pinhole in a barrier.
Figure 3:
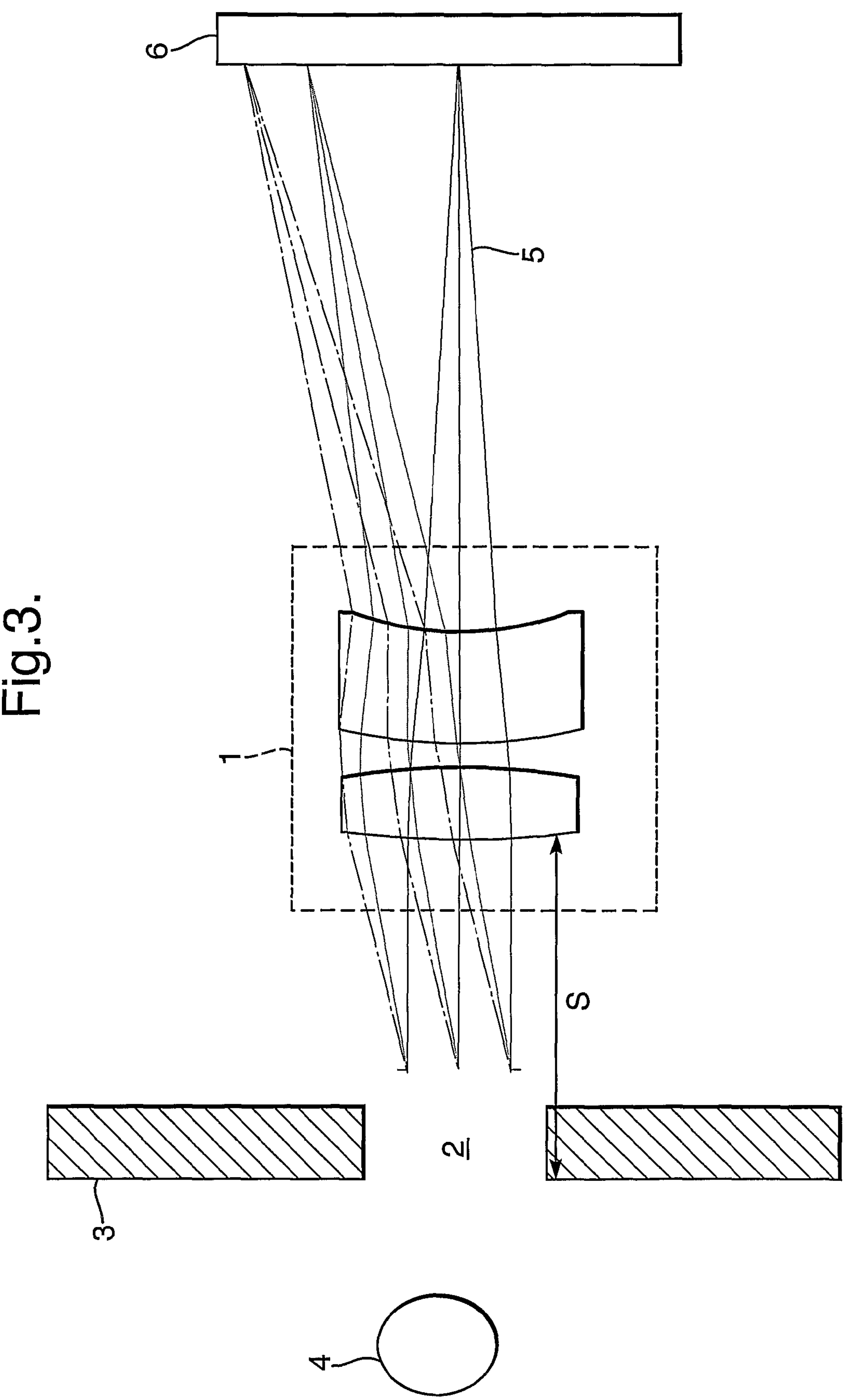
FIG. 3 shows an embodiment of the lens arrangement according to the present invention optimised for a field of view of 25 degrees and located behind a pinhole in a barrier.
Figure 4:
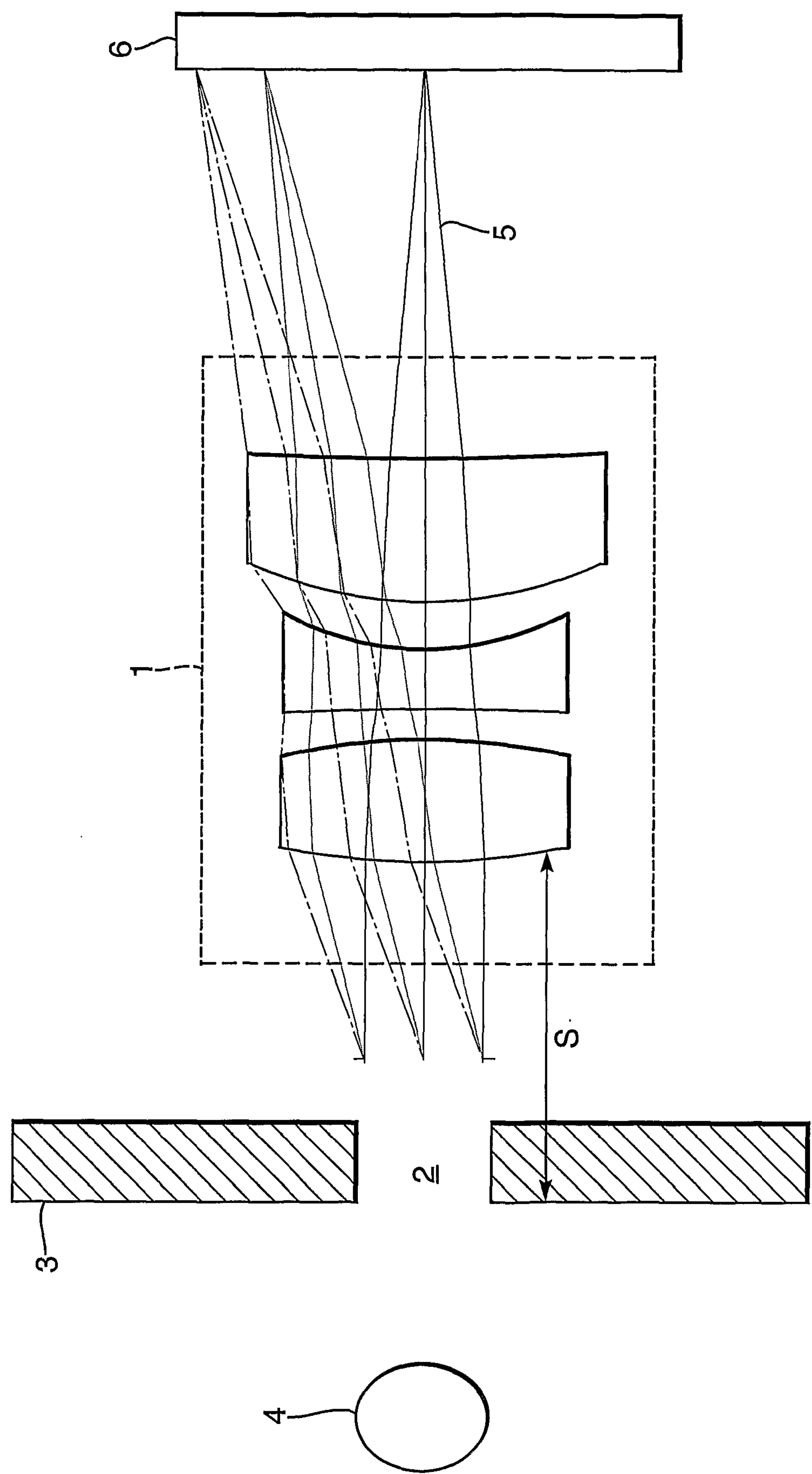
FIG. 4 shows an embodiment of the lens arrangement according to the present invention optimised for a field of view of 40 degrees and located behind a pinhole in a barrier.
Figure 5:
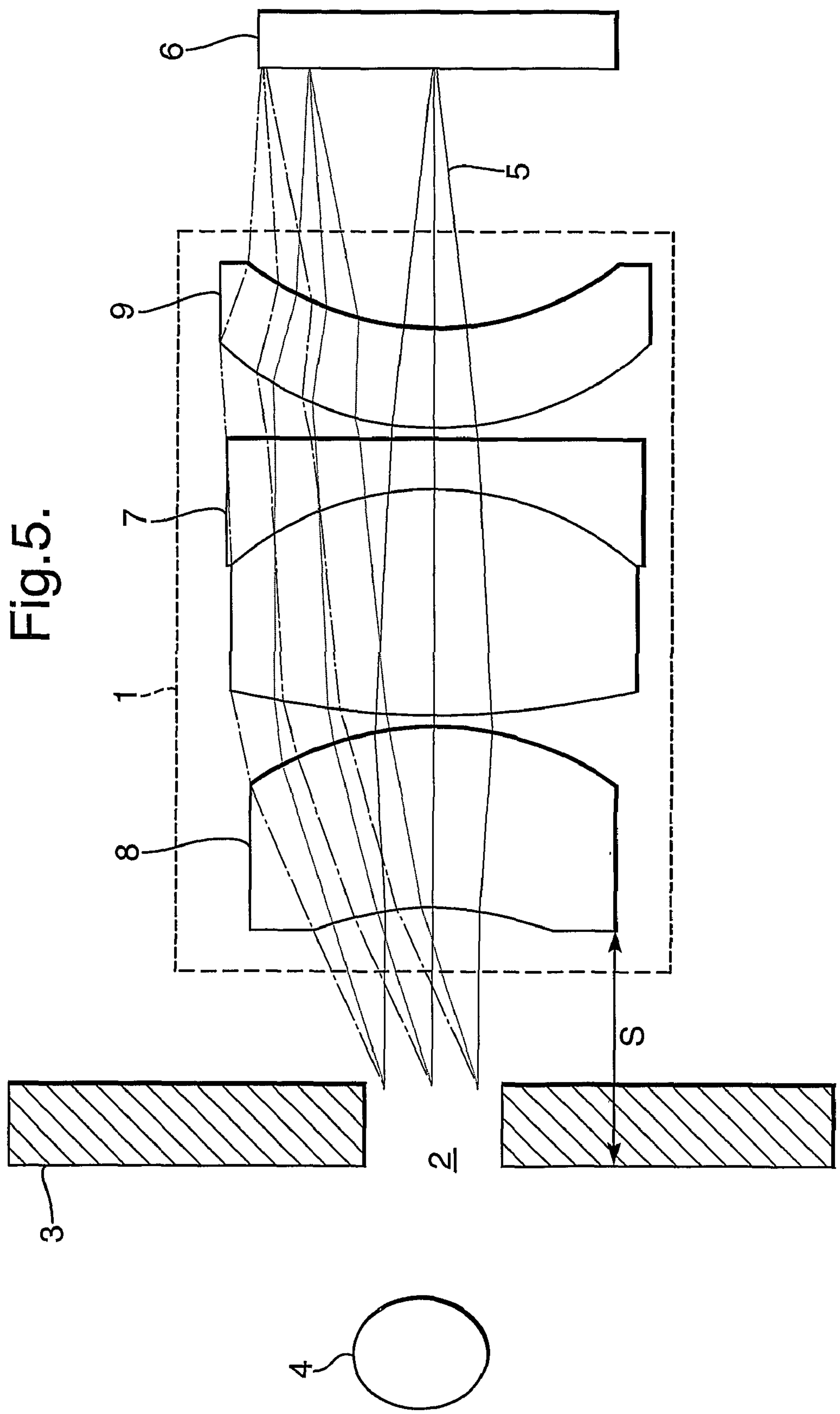
FIG. 5 shows an embodiment of the lens arrangement according to the present invention optimised for a field of view of 50 degrees and located behind a pinhole in a barrier.
Figure 6:
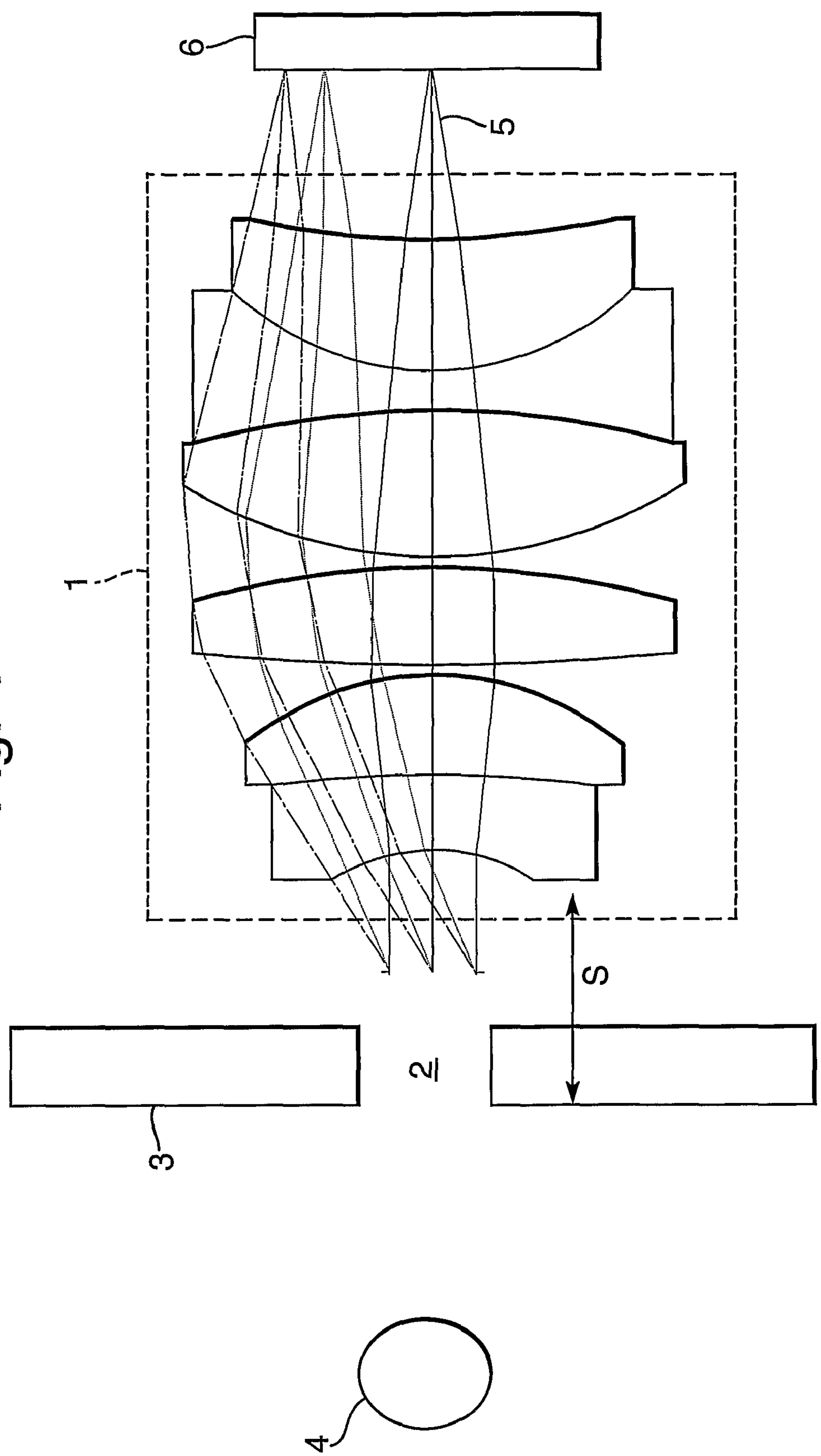
FIG. 6 shows an embodiment of the lens arrangement according to the present invention optimised for a field of view of 65 degrees and located behind a pinhole in a barrier.

Referring to FIG. 5, lens arrangement according to the invention (1) is placed a stand off distance (S) behind a pinhole (2) of approximately 1 mm diameter drilled in a wall (3), enabling an image of a target subject (4) to be captured. An incident ray (5) is shown passing through the lens arrangement (1) and being focused on an optical sensor (6). The lens arrangement (1) is optimised to project a virtual aperture forward into object space, by a distance that equates to the stand off distance (S), thus limiting the pencil of rays entering the device and reducing the vignetting caused by the pinhole (2).

The nominal stand off distance (S) between the lens arrangement and the pinhole (2) for this embodiment of the invention is approximately 3 mm and the total length of the system, or "throw", is approximately 16.5 mm. However, the stand off distance (S) may in fact be anywhere between 2 mm and 6 mm without any significant loss of image quality. This is due to the overdesign of the lenses, which is such that the virtual aperture projected by the lens arrangement (1) is approximately 1.5 times the size required for a lens at the nominal stand off distance (i.e. 3 mm).

The lens arrangement (1) in this embodiment is optimised to provide a field of view of 50 degrees and comprises a cemented doublet lens element (7) straddled by two singlet lens elements (8 and 9) as described above; the singlet closest to the object being viewed (8) comprising a negatively shaped meniscus lens, and the singlet closest to the image capturing means (9) comprising a positively shaped meniscus lens. The crown element of the cemented doublet (7) faces the first meniscus lens (8). The lens arrangement (1) has a focal length of 6.5 mm, therefore when the lens arrangement (1) is placed behind the 1 mm pinhole (2) it has an optical speed of F/6.5. If no pinhole (2) or wall (3) were used the lens arrangement would operate naturally in the range of F/5-F/8 due to the limitation of the pencil of rays caused by the virtual aperture produced by the reverse eyepiece type lens configuration.

Tests have shown that a device according to this embodiment of the invention has an image distortion of only 10% and gives a resolution of approximately 0.61 MTF at 80 c/mm.

At the focal plane of the lenses an optical sensor (6) (in this case a ⅓ inch CCD) is placed enabling a still or moving image to be recorded. These images may either be recorded locally or transmitted in any known way to a remote receiving station, located for example, in a vehicle parked outside a building under surveillance.

In order to further reduce the likelihood of a surveillance camera being detected the lens arrangement may further comprise a physical shutter which can be deployed when the camera is not in use to block the device from view. This shutter system may be deployed in front of the optical sensor (6) in order to eliminate retro-reflection or it may be installed in front of the lens assembly as a whole in order to completely eliminate the optical signature of the device (i.e. to block all stray light emanating from the device).

Lenses of the type hereinbefore described may advantageously be optimised to provide a particular field of view. Fields of view between 1 degree and 90 degrees are practical and a range of lenses may usefully be provided with a camera system to provide for different circumstances and requirements.

For a pinhole surveillance camera a range of lenses to produce fields of view between 12 degrees and 65 degrees has been found to be particularly appropriate.

The invention claimed is:

1. A lens arrangement, suitable for looking through pinholes, comprising a plurality of lens elements configured to operate without the presence of an integral physical lens stop, such that in use the lens arrangement projects a virtual aperture to a point in object space beyond a first end of the lens arrangement, said first end being the end of the lens arrangement closest to a subject being viewed, and wherein the virtual aperture acts as a remote entrance pupil in object space beyond the first end of the lens arrangement and defines a pencil of rays passing into the lens arrangement.

2. A lens arrangement as claimed in claim 1 wherein the plurality of lens elements comprises a positively shaped lens element located at the first end of the lens arrangement followed by a negatively shaped lens element.

3. A lens arrangement as claimed in claim 1 wherein the plurality of lens elements comprises a positively shaped lens element located at the first end of the lens arrangement followed by a meniscus shaped lens element configured to act as a field flattener.

4. A lens arrangement as claimed in claim 1 wherein the plurality of lens elements comprises two positively shaped lens elements with a negatively shaped lens element located between them.

5. A lens arrangement as claimed in claim 1 wherein the plurality of lens elements comprises a negatively shaped meniscus lens element located at the first end of the lens arrangement and configured to control the position of the virtual aperture.

6. A lens arrangement according to claim 1 wherein the lens arrangement incorporates a physical shutter to block the lens arrangement from view when it is not in use.

7. A pinhole camera for use in surveillance incorporating the lens arrangement claimed in claim 1.

8. A lens arrangement as claimed in claim 5 in which the plurality of lens elements further comprises a positively shaped meniscus lens element located at a second end of the lens arrangement, the second end being the end of the lens arrangement nearest an image capturing means, and the positively shaped meniscus lens element being configured to control the field curvature and astigmatism of an image produced by the lens arrangement.

9. A lens arrangement as claimed in claim 8 in which the plurality of lens elements further comprises an achromatic doublet lens element located between the negatively shaped meniscus lens element situated at the first end of the lens arrangement and the positively shaped meniscus lens element situated at the second end of the lens arrangement, the achromatic doublet lens element being configured to control chromatic aberrations in the image produced by the lens arrangement.

10. A lens arrangement as claimed in claim 5 in which the plurality of lens elements further comprises a cemented triplet lens element situated at a second end of the lens arrangement, the cemented triplet lens element being configured to control the lateral color and astigmatism of an image produced by the lens arrangement.

11. A lens arrangement as claimed in claim 10 in which the plurality of lens elements further comprises a bi-convex lens element located between the negatively shaped meniscus lens element situated at the first end of the lens arrangement and the cemented triplet lens element situated at the second end of the lens arrangement.

12. A lens arrangement as claimed in claim 11 wherein the negatively shaped meniscus lens element situated at the first end of the lens arrangement comprises a cemented doublet lens element.

13. A method of obtaining images covertly, comprising:

a. configuring a lens arrangement comprising a plurality of lens elements such that in use the lens arrangement projects a virtual aperture to a point in object space beyond a first end of the lens arrangement, the first end being the end of the lens arrangement closest to a subject being viewed, the virtual aperture being configured to act as a remote entrance pupil and define a pencil of rays that passes through the lens arrangement;

b. locating the lens arrangement behind a pinhole in a barrier that is unconnected to the lens arrangement;

c. arranging the lens arrangement behind the pinhole such that the pinhole acts as the aperture stop of the lens arrangement, and d. locating an image capturing means at an image plane to capture the image.

14. A method as claimed in claim 13 wherein the diameter of the virtual aperture is in the range of one to five times the size of the diameter of the pinhole to be looked through.

15. A method as claimed in claim 14 wherein the diameter of the virtual aperture is approximately 1.5 times the diameter of the pinhole being looked through.

16. A method as claimed in claim 13 wherein the distance between the lens arrangement and the pinhole is in the range of 0.5 mm to 10 mm.

* * * * *